(12) United States Patent
Biester

(10) Patent No.: US 7,281,443 B2
(45) Date of Patent: Oct. 16, 2007

(54) MANUAL CONTROL DEVICE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 572 days.

(21) Appl. No.: 10/416,102

(22) PCT Filed: Oct. 30, 2001

(86) PCT No.: PCT/EP01/12553

§ 371 (c)(1),
(2), (4) Date: Sep. 4, 2003

(87) PCT Pub. No.: WO02/37005

PCT Pub. Date: May 10, 2002

(65) Prior Publication Data

US 2005/0098754 A1    May 12, 2005

(30) Foreign Application Priority Data

Oct. 30, 2000   (DE) .......................... 200 18 565 U

(51) Int. Cl.
*F16K 31/05* (2006.01)
*E21B 33/06* (2006.01)

(52) U.S. Cl. ............... 74/89.34; 74/89.23; 251/264

(58) Field of Classification Search ............... 74/89.23, 74/89.26, 89.34; 251/264–266; 254/98
See application file for complete search history.

(56) References Cited

U.S. PATENT DOCUMENTS

| 1,812,297 | A |   | 6/1931  | Jensen |
|-----------|---|---|---------|--------|
| 1,989,429 | A |   | 1/1935  | Segelhorst et al. .......... 251/159 |
| 2,724,978 | A |   | 11/1955 | Morrell .......... 74/425 |
| 3,055,632 | A | * | 9/1962  | Scaramucci .......... 251/266 |
| 3,324,741 | A |   | 6/1967  | Anderson .......... 74/625 |
| 3,628,397 | A |   | 12/1971 | Sheesley .......... 74/625 |
| 3,637,188 | A | * | 1/1972  | Ung .......... 251/120 |

(Continued)

FOREIGN PATENT DOCUMENTS

DE   18 90 441   4/1964

(Continued)

OTHER PUBLICATIONS

German Search Report for Appln. No. 200 18 565.9; Dated May 7, 2001 (pp. 4).

*Primary Examiner*—William C. Joyce
(74) *Attorney, Agent, or Firm*—Conley Rose, PC

(57) ABSTRACT

Manual actuating device for the actuation of an appliance, subjected to a force in a direction opposite to the actuation direction, especially in the production of mineral oil or natural gas, such as a blowout preventer (BOP), valve, actuator, throttle or similar, with a rotating spindle, which can be connected to a displacing element of the appliance, moveable in the actuation direction, and with a regulating device, drive-connected through at least one mechanism and which can be manually actuated.

In order to improve such a manual actuating device such that, even with a low number of revolutions of the regulating device, high forces on the rotating spindle and therefore on the displacing element can be transferred and there is no need for supporting equipment, such as hydraulics or similar, the mechanism exhibits a screw drive with screw drive nut and the rotating spindle as recirculating spindle, whereby the screw drive nut is drive-connected to the regulating device.

29 Claims, 2 Drawing Sheets

U.S. PATENT DOCUMENTS

| | | | |
|---|---|---|---|
| 4,189,950 A | 2/1980 | Killian | 74/424.8 |
| 4,295,390 A * | 10/1981 | Buchta | 74/625 |
| 4,493,336 A | 1/1985 | Renfro | 137/312 |
| 4,569,503 A | 2/1986 | Karr, Jr. | 251/14 |
| 5,261,446 A * | 11/1993 | Baker | 137/458 |
| 5,370,011 A | 12/1994 | Gilges et al. | 74/89 |

FOREIGN PATENT DOCUMENTS

| | | |
|---|---|---|
| DE | 14 11 745 | 3/1969 |
| DE | 38 27 880 | 2/1990 |
| DE | 42 06 773 | 9/1992 |
| DE | 29506364.5 | 4/1995 |
| DE | 196 37 526 | 9/1996 |
| DE | 197 36 734 | 8/1997 |
| DE | 43 22 133 | 1/2005 |
| EP | 0 507 027 | 10/1992 |
| EP | 10 24 422 | 8/2000 |
| WO | WO84/02405 | 6/1984 |

* cited by examiner

MANUAL CONTROL DEVICE

BACKGROUND OF THE INVENTION

The invention relates to a manual actuating device for the actuation of all appliance especially subjected to a force in a direction opposite to the actuation direction, especially in the production of mineral oil or natural gas, such as a blowout preventer (BOP), valve, actuator, throttle or similar, with a rotating spindle, which can be connected to a displacing element of the appliance, moveable in the actuation direction, and with a regulating device, drive-connected through at least one mechanism and which can be manually actuated.

Such a manual actuating device is, for example, known in connection with a manually actuated blowout preventer (BOP). Such a blowout preventer is used to close a borehole in the production of mineral oil and natural gas. Closure occurs here through, for example, bringing together two clamping jaws from opposite sides of the borehole. These clamping jaws engage tightly in one another and close off the riser.

The relevant clamping jaws are here the displacing elements of the BOP, which are subjected to a force through the pressure within the riser in the direction opposite to the actuation direction of the manual actuating device. The applied force arises through the high pressure within the riser which, for example, can be up to 700 bar or even higher. This means that the displacing element must be moved against a load of 20 tonnes or more.

With the manual actuating device known in practice the regulating device which can be manually actuated is normally a handwheel which moves a rotating spindle in its longitudinal direction via an intermediate mechanism and thereby also correspondingly moves the displacing element connected to the rotating spindle.

From practice hydraulically actuated actuating devices of the above type are also known. With these however appropriately complex equipment for the hydraulic supply, pressure generation, control of the hydraulic system, etc are needed.

With the above mentioned manual actuating device it has been established that the handwheels must be relatively large in order to move the displacing element and the rotating spindle despite the large load acting against the direction of actuation. For this purpose, mechanisms have been produced which exhibit a low efficiency and, although they reduce the forces required for actuating the regulating device, the number of revolutions for actuating the regulating device is substantially increased. This led to this type of solution being essentially too slow in an emergency for moving the displacing element or bringing the closing jaws of the BOP together.

BRIEF SUMMARY OF THE PREFERRED EMBODIMENTS

The object of the invention is therefore to improve a manual actuating device of the type mentioned at the beginning in that, even with a low number of revolutions of the regulating device, high forces on the rotating spindle and therefore on the displacing element can be transferred and there is no need for supporting equipment, such as hydraulics or similar.

This object is solved in relation to the characteristics of the generic term of claim 1 in that the mechanism comprises a screw drive with screw drive nut and rotating spindle as recirculating spindle, whereby the screw drive nut is drive-connected to the regulating device.

Due to the screw drive, within the mechanism a correspondingly high transmission ratio arises which displaces the rotating spindle sufficiently far just with a few revolutions of the regulating device. In addition, such a screw drive enables the transfer of high torques, is relatively small and exhibits a high efficiency.

One possible realization of such a screw drive is a ball screw drive. Here, the screw drive nut is formed as a ball screw nut and the rotating spindle as a recirculating ball spindle. In order to obtain a screw drive with still higher load-bearing capacity, higher reliability and a longer service life, this drive can be formed as roll screw drive. Then the drive nut is formed as a roll drive nut and the rotating spindle as a recirculating roll spindle.

Especially smooth running with low material fatigue and functional capability even under harsh conditions arises in particular with a planetary roll screw drive as the roll screw drive.

In order to be able to especially attach a screw drive in a simple way to the corresponding appliance, the manual actuating device can exhibit a device housing which can be flange-connected to the appliance. In this housing the screw drive and other components of the manual actuating device are accommodated. In addition, the screw drive is protected by the device housing against external influences.

In order to be able to assign the device housing to the appliance in a simpler manner and to seal it with respect to the appliance, the device housing can exhibit an insertion protrusion which can be inserted into an indentation in the appliance housing and in which the displacing element is supported for displacement. The displacing element extends beyond the insertion protrusion into the appliance housing and, for example, up to the closing jaws of a blowout preventer.

In order to be able to fix and mount the manual actuating device in a simple way relative to the appliance housing, the device housing can exhibit a surrounding ring flange spaced from the insertion protrusion at its free end for mounting externally in the appliance housing. The mounting can be implemented using appropriate threaded bolts. Appropriate spacer rings or similar can be arranged between the outer side of the appliance housing and the ring flange.

In order to provide a seal in a simple manner between the insertion protrusion and the wall of the indentation in the appliance housing, a sealing ring can be releasably attached to the free end of the insertion protrusion. This sealing ring can include and position appropriate sealing elements between the insertion protrusion and the appliance housing. The sealing ring can be fixed to a face side of the free end of the insertion protrusion by threaded bolts or similar.

In order to also be able to appropriately seal the displacing element within the insertion protrusion, a ring insert can be releasably located in a bearing hole of the insertion protrusion, which accommodates the displacing element, from the side of its free end. Also this ring insert can be used for retaining sealing elements or also bearings between a wall of the bearing hole and an external circumference of the displacing element.

For the easy fitting and removal of the manual actuating device a quickly producible and releasable connection between the displacing element and the rotating spindle is also advantageous. This can, for example, be realized in that the rotating spindle at its front end facing the insertion protrusion is releasably connected to the displacing element. Consequently, no further components are necessary for the connection of the rotating spindle and the displacing element. The connection of both of these is essentially direct.

A simple method of obtaining such a direct connection can be seen in that the front end of the rotating spindle can be inserted into a receiving indentation on the end of the displacing element where it can be releasably fixed especially by a dowel pin.

A simple way of arranging the dowel pin can be seen in that an insertion hole for the dowel pin, extending transversally to the longitudinal direction of the rotating spindle, is formed at the front end of the rotating spindle. This hole is aligned with an appropriate transverse hole on the end of the displacing element, so that the dowel pin can be inserted into the insertion hole in the rotating spindle in a simple manner when holes suitably line up.

In order to be able to use screw drives from different manufacturers in a simple manner with the manual actuating device according to the invention, the screw drive nut can be arranged within the device housing rotationally rigidly in a rotating collar which is rotationally supported, but fixed in the axial direction in the said device housing. The rotating collar exhibits suitable internal dimensions depending on the applied screw drive with appropriate screw drive nut, whereby the external dimensions can be the same for the manual actuating device according to the invention. In addition, through these additional rotating collars no work is needed directly on the screw drive nut for its fixing in the longitudinal direction in the device housing. The rotating collar can, for example, be shrunk onto the screw drive nut or rotationally rigidly connected to it in some other manner.

In order to lightly rotationally support the rotating collar within the device housing, whereby both radial forces and, where necessary, axial forces can be accepted, roller bearings, especially spherical roller bearings, can be arranged between a wall of the rotating collar and a wall of the longitudinal hole of the device housing.

In order to define the position of the roller bearings and therefore especially also the rotating collar and screw drive nut in the axial direction, the roller bearings can be retained in indentations both in the wall of the longitudinal hole as well as in the wall of the rotating collar so that they cannot be displaced.

In order to be able to arrange the roller bearings at the appropriate point in a simple manner after inserting the screw drive and the rotating collar in the device housing, a fixing ring for holding the roller bearings can be mounted especially releasably on the device housing and/or on the rotating collar.

The arrangement of the roller bearings is particularly simple in this connection if the fixing ring forms an edge of the indentation in the wall of the rotating collar and/or in the wall of the longitudinal hole of the device housing.

A simple arrangement and attachment of the fixing ring can be seen in that it is screwed onto one end of the rotating collar.

In order to reliably close the device housing and also its longitudinal hole on the side facing away from the appliance, a rotating cap can be placed on the end of the device housing facing the regulating device and rotationally rigidly connected to the rotating collar. Due to the rotationally rigid connection to the rotating collar, the rotating cap can also be directly used for the transfer of a rotational movement from the manually actuated regulating device onto the rotating collar and therefore to the screw drive nut.

A simple possibility for the rotationally rigid connection of the rotating cap and the rotating collar can be seen in that the rotating cap is releasably attached to the fixing ring.

In order to construct the manual actuating device according to the invention as compactly as possible, a spindle receiving indentation can be formed in the rotating cap. In this cap the rotating spindle is, for example, arranged in a position in which the displacing element is drawn in as far as possible into the device housing.

In order to be able to connect the regulating element to the rotating cap in a simple manner, a mounting surface for a connection adapter for the rotationally rigid connection of the regulating device and the rotating cap can be formed on an outer side of the rotating cap pointing away from the device housing.

The connection adapter can be formed in such a way that a handwheel, for example, can be directly rotationally connected to the rotating cap as a regulating device.

In addition, the connection adapter can also be formed such that a cardan shaft connection between the handwheel and the connection adapter can be produced. This cardan shaft connection can be formed from a number of single shafts connected together using cardan joints.

In order to be able to hold the rotating cap in certain rotational positions without holding the handwheel or fixing the regulating device, a locking device for fixing a suitable rotational position of the rotating cap relative to the device housing can be assigned to the rotating cap.

A simple and economically producible locking device can be seen in that it exhibits a large number of insertion holes in the circumferential direction of the rotating cap in its outer side and insertion pins, supported in a displaceable manner on the device body in the direction of the insertion hole.

In order to ensure, where necessary that the insertion pin automatically latches into a suitable insertion hole, the insertion pin can be subjected to spring pressure in the direction of the insertion hole.

In order to withdraw the insertion pin so far from the rotating cap that it is freely rotatable relative to the insertion pin, a retention pin, moveable along a connecting link, can protrude from the insertion pin. If the retention pin is moved along the connecting link to such a position in which the insertion pin can no longer engage in the insertion hole, a free rotation of the rotating cap arises.

A simple embodiment of such a connecting link can be seen in that the connecting link is formed in a wall of a housing collar accommodating an insertion pin and spring element.

BRIEF DESCRIPTION OF THE DRAWINGS

In the following the invention is explained in more detail based on the figures enclosed in the drawing.

DETAILED DESCRIPTION OF THE PREFERRED EMBODIMENTS

Figure 1:
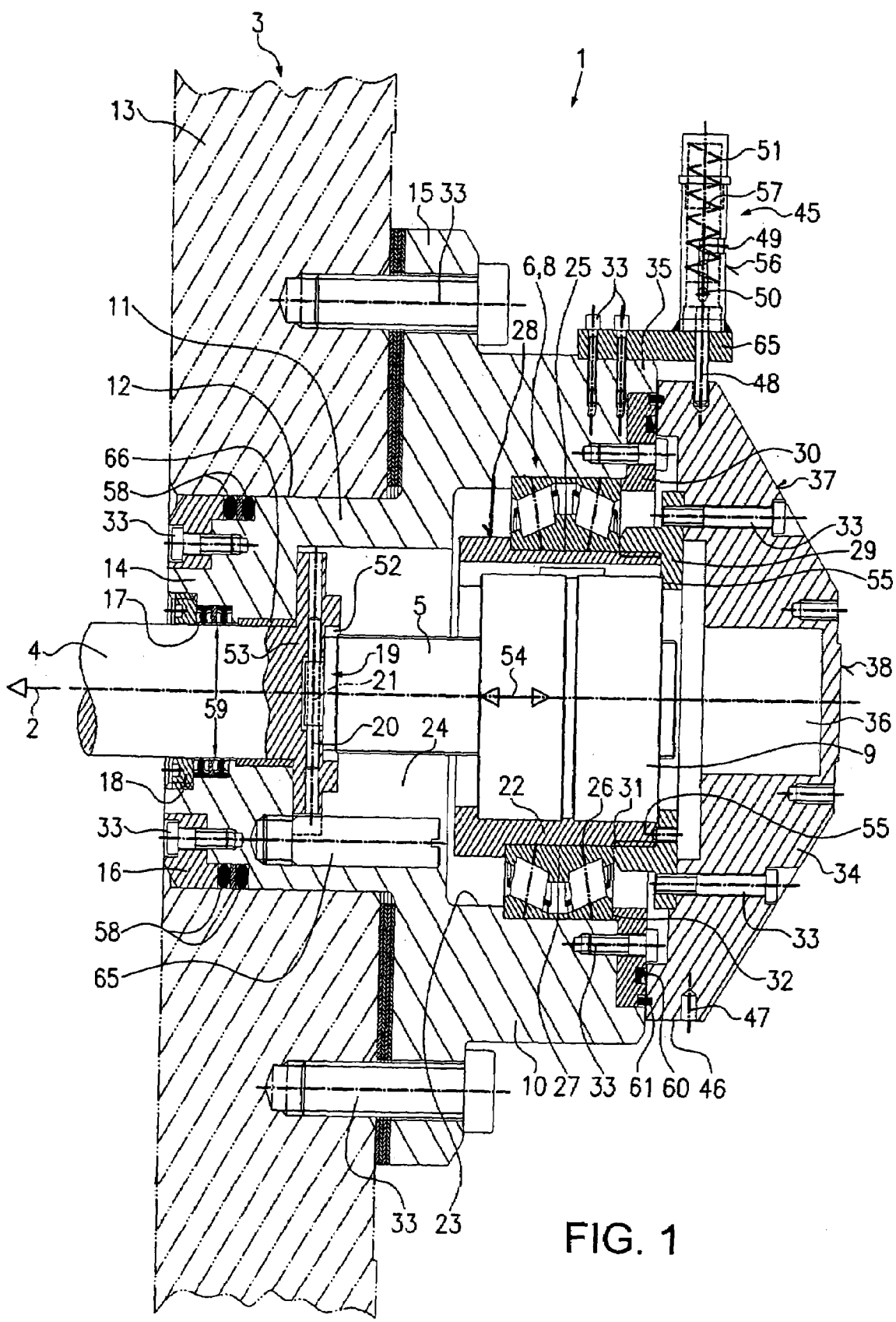
FIG. 1 shows a longitudinal section through an embodiment of a manual actuating device according to the invention.
Figure 2:
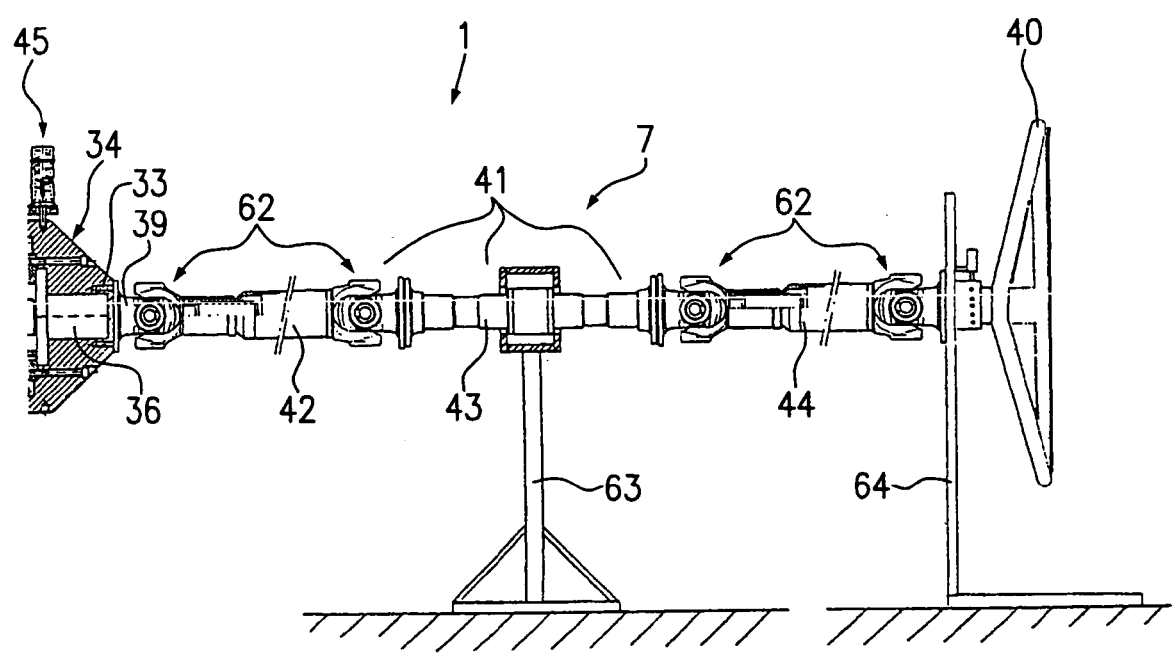
FIG. 2 shows a side view of a regulating device as another part of the manual actuating device according to the invention.

In FIGS. 1 and 2 an embodiment of a manual actuating device 1 according to the invention is shown, whereby in FIG. 2 only a suitable regulating device 7 is essentially shown and in FIG. 1 a longitudinal section is illustrated through a component of the manual actuating device 1 arranged between the regulating device 7 and an appliance 3 to be correspondingly actuated.

In the longitudinal section according to FIG. 1a device housing 10 can especially be seen. This housing exhibits an insertion protrusion 11 which is inserted into an indentation 12 in an appliance housing 13 from its outside. The insertion protrusion 11 is essentially formed cylindrically and exhibits a bearing hole 17 in which a displacing element 4 is supported so that it can be displaced. At the free end 14 of the insertion protrusion 11 a sealing ring 16 and a ring insert 18 are located. The sealing ring 16 is pushed onto the free end 14 into a suitable edge recess of the insertion protrusion 11 and releasably attached there by threaded bolts 33. Sealing elements 58 are arranged between the end of the sealing ring 16, the outer circumference of the insertion protrusion 11 and the inner wall of the indentation 12 of the appliance housing 13.

The ring insert 18 is inserted at the free end 14 of the insertion protrusion 11 into its bearing hole 17 and similarly attached there releasably. Appropriate ball bearings 59 are arranged between the ring insert and an internal wall of the bearing hole 17 as well as an external circumference of the displacing element 4.

Spaced from the free end 14 of the insertion protrusion 11, the device housing 10 exhibits a radially outwards protruding ring flange 15. This flange is in contact with an outer side of the appliance housing 13 and is releasably attached there using suitable threaded bolts 33. Spacer elements such as washers or similar are arranged between the ring flange 15 and the outer side of the appliance housing 13.

The device housing 10 extends from the ring flange away from the appliance housing 13, whereby a longitudinal hole 24 is formed in the device housing. A rotating spindle 5 as part of a screw drive 8 forming a mechanism 6 is arranged in the longitudinal hole. The rotating spindle 5 is especially formed as a planetary recirculating roll spindle and can be displaced by rotating an associated planetary roll nut 9 in the actuation direction 2. The rotating spindle 5 is inserted at its front end 19, assigned to the displacing element 4, in an indentation 52 at the assigned end 53 of the displacing element 4. At the end 19 is furthermore an extension formed in which an insertion hole 21 is formed. This hole extends transversal to the longitudinal direction 54 of the rotating spindle 5. The insertion hole 21 is arranged in the illustration according to FIG. 1 aligned to a transverse hole in the end 53 of the displacing element 4 and is pushed into this transverse hole via the receiving indentation 52. In the transverse hole and in the insertion hole 21 a dowel pin 20 is inserted which connects the rotating spindle 5 and the displacing element 4 together.

The longitudinal hole 24 is widened in the region of the screw drive nut 9 to accept it. The screw drive nut 9 is arranged rotationally rigidly in a rotating collar 22 which completely surrounds it. The rotating collar 22 exhibits in its outer wall 28 a surrounding indentation 26 which is located opposite an appropriate indentation in an inner wall 23 on the longitudinal hole 24 In these indentations, a roller bearing 25, especially in the form of a spherical roller bearing, is arranged between the rotating collar 22 and the device housing 10. Consequently, radial and axial forces transferred via the rotating collar 22 are accepted and transferred to the device housing 10.

Edges 31, 32 of the indentations 26, 27 are formed through fixing rings 29, 30 which are provided on the end 35 of the device housing 10 pointing away from the appliance housing 13. The fixing ring 30 is releasably attached using threaded bolts 33 to the end 35 of the device housing 10. The fixing ring 29 is screwed onto an end 55 of the rotating collar 22.

In its outer side facing a rotating cap 34, the fixing ring 30 carries a sealing element 60 and a guiding element 61 for the rotational guidance of the rotating cap 34.

The fixing ring 29 exhibits a ring flange 65, protruding radially inwards at the end 55 of the rotating collar 22, the said ring flange fixing the screw drive nut 9 within the rotating collar 22 at the end of the screw drive nut pointing towards the rotating cap 34.

The rotating cap 34 is releasably connected to the fixing ring 29 via threaded bolts 33. The rotating cap 34 exhibits a cross-section essentially in the form of a truncated cone, whereby the tip of the truncated cone points away from the device housing 10. This tip is formed with a mounting surface 38 on which a connection adapter 39 is releasably fixed with threaded bolts 33 (see FIG. 2).

Inside the rotating cap 34 a spindle receiving indentation 36 extends from the mounting surface 38 in the direction of the screw drive nut 9. The spindle 5 can be introduced into this spindle receiving indentation in order to move the displacing element 4 in the direction opposite to the actuation direction 2 illustrated in FIG. 1 further into the device housing 10.

Offset parallel to the rotating spindle 5 a guide pin 65 is screwed which prevents the displacing element 4 from rotating through especially positive locking engagement at its end pointing to the rotating spindle. Furthermore, the displacing element 4 adjacent to its end facing the rotating spindle 5 is supported within the bearing hole 17 using a sliding collar 66 to reduce the friction.

The rotating cap 34 closes one end 35 of the device housing 10 and similarly the longitudinal hole 24, whereby a suitable seal between the rotating cap 34 and the device housing 10 occurs due to the sealing element 16 between the fixing ring 30 and the rotating cap 34.

The mounting surface 38 forms a part of the outer surface 37 of the rotating cap 34.

Another part of the outer surface 37 is formed by the side surfaces of the rotating cap 34 which run in the longitudinal direction 54 of the device housing 10. In these side surfaces a large number of insertion holes 47 are formed in the circumferential direction 46. These insertion holes are used for fixing the rotating cap 34 in a certain rotational position. The fixing occurs by engagement of an insertion pin 48 into one of the insertion holes 47. The insertion pin 48 forms part of a locking device 45.

The locking device 45 exhibits a housing collar 51 which protrudes from a connection plate 65. The connection plate 65 is releasably attached to the device housing 10 using threaded bolts 33. The housing collar 51 is attached on the connection plate 65, for example, by welding. The insertion pin 48 is supported within the housing collar 51 and is subject to a force by a spring element 57 in the direction of the insertion holes 47. A retention pin 50 protrudes radially sidewards and outwards in front of the insertion pin 48, the retention pin 50 protruding outwards due to a connecting link 49 formed in the housing collar 51. The connecting link 49 comprises a first connecting link section which runs parallel to the longitudinal direction of the insertion pin 48 and another connecting link section which runs transversally to the first connecting link section. If the retention pin 50 is arranged in the transversally running connecting link section, then the insertion pin 48 is drawn into the housing collar 51 so far that the rotating cap 34 can be freely rotated.

In FIG. 2 a side view of the regulating device 7 is illustrated, whereby the components according to FIG. 1 are only partially illustrated. Especially in FIG. 2 the rotating cap 34 can be seen. The connection adapter 39 is releasably attached to the rotating cap on the mounting surface 38 using threaded bolts 33. Between the connection adapter 39 and the handwheel 40 a cardan shaft connection 41 of shafts 42, 43 and 44 is arranged for the manual actuation of the manual actuating device 1. The shafts 42, 43, 44 are connected together and with the handwheel 40 or with the connection adapter 39 via cardan joints 62.

A central support 63 is provided approximately centrally to the cardan shaft connection 41. Furthermore, a guard plate 64 is arranged between the handwheel 40 and the cardan shaft connection 41. The guard plate is intended to protect a person operating the handwheel 40 from any hazards from the region of the appliance 3.

The invention claimed is:

1. A manual actuating device for the actuation of an appliance subjected to a force in a direction opposite to the actuation direction, wherein the appliance has a spindle connected to a displacing element that is moveable in the actuation direction by a regulating device, wherein said manual actuating device comprises:
   a screw drive having a screw drive nut drive-connected to the regulating device;
   a rotating collar rotationally rigidly connected to the screw drive nut and to a rotating cap, wherein the rotating cap is connected to the regulating device in a moveable manner; and
   a locking device attached to the rotating cap and adapted to hold a corresponding rotational position of the rotating cap relative to a housing connected to the appliance, wherein said locking device comprises:
      a plurality of insertion holes formed along the outside circumference of the rotating cap; and
      an insertion pin supported on the housing and adapted to be displaced in the direction of the insertion holes.

2. The manual actuating device according to claim 1, wherein the screw drive is a ball screw drive.

3. The manual actuating device according to claim 1, wherein the screw drive is a roller screw drive.

4. The manual actuating device according to claim 3, wherein the roller screw drive is a planetary roller screw drive.

5. The manual actuating device according to claim 1, wherein the housing is flange-connected to the appliance.

6. The manual actuating device according to claim 5, wherein the housing comprises an insertion protrusion that is inserted into the appliance.

7. The manual actuating device according to claim 6, wherein the housing further comprises a surrounding ring flange spaced at its flee end to the insertion protrusion and adapted for external attachment to the appliance.

8. The manual actuating device according to claim 7, further comprising a sealing ring releasably attached to the insertion protrusion.

9. The manual actuating device according to claim 8, further comprising a ring insert releasably inserted into a beating hole of the insertion protrusion, wherein said ring insert is adapted to accommodate one end of the displacing element.

10. The manual actuating device according to claim 9, wherein the spindle is releasably connected, at its front end facing the insertion protrusion, to the displacing element.

11. The manual actuating device according to claim 10, wherein the front end of the spindle is adapted to be inserted into a receiving indentation on one end of the displacing element, wherein the rotating spindle is releasably fixed to the displacing element by a dowel pin.

12. The manual actuating device according to claim 11, further comprising an insertion hole extending transversally to the longitudinal direction of the spindle and adapted to accept the dowel pin on the front end of the spindle.

13. The manual actuating device according to claim 12 wherein the screw drive nut is arranged within the device housing in the rotating collar which is rotationally supported in said housing, but rotationally rigidly fixed in the longitudinal direction.

14. The manual actuating device according to claim 13, further comprising roller bearings, or spherical roller bearings, are arranged between the rotating collar and the wall of a longitudinal hole through the housing.

15. The manual actuating device according to claim 14, wherein the roller bearings are held, so that they cannot be displaced, in indentations both in the wall of the longitudinal hole and in the rotating collar.

16. The manual actuating device according to claim 15, further comprising a fixing ring, adapted to hold the roller bearings, releasably mounted on the housing and/or on the rotating collar.

17. The manual actuating device according to claim 16, wherein the fixing ring forms an edge of the indentations in the rotating collar and the wall of the longitudinal hole.

18. The manual actuating device according to claim 17, wherein the fixing ring is screwed onto one end of the rotating collar.

19. The manual actuating device according to claim 18, wherein the rotating cap is located on the end of the housing facing the regulating device.

20. The manual actuating device according to claim 19, wherein the rotating cap is releasably attached to the fixing ring.

21. The manual actuating device according to claim 20, further comprising a spindle receiving indentation formed in the rotating cap.

22. The manual actuating device according to claim 21, further comprising a mounting surface, formed on an external side of the rotating cap pointing away from the housing, for a connection adapter for the rotationally rigid connection of the regulating device and the rotating cap.

23. The manual actuating device according to claim 22, wherein the regulating device has at least one handwheel.

24. The manual actuating device according to claim 23, further comprising a cardan shaft connection arranged between the handwheel and the connection adapter.

25. The manual actuating device according to claim 1, wherein the insertion pin is subject to spring pressure in the direction of the insertion hole.

26. The manual actuating device according to claim 25, wherein the locking device further comprises a retaining pin, moveable along a connecting link, protruding from the insertion pin.

27. The manual actuating device according to claim 26, wherein the connecting link is formed in a wall of a housing collar accommodating the insertion pin with a spring element.

28. A linear actuator comprising:
   a spindle coupled to an axially translatable member disposed within a body;
   a screw drive nut engaged with said spindle and rotatable relative to the body;
   a rotating cap coupled to said screw drive nut;
   a plurality of insertion holes formed along the outside circumference of said rotating cap; and an insertion pin supported on the body and operable to selectively engage one of said plurality of insertion holes.

29. A manual actuator comprising:
a cap rotatably coupled to a body;
a screw drive nut coupled to said rotating cap;
a bearing disposed between said screw drive nut and the body such that said screw drive nut rotatable relative to said body, wherein said bearing axially fixes said screw drive nut relative to the body;

a spindle engaged with said screw drive nut and coupled to an axially translatable member disposed within the body, wherein said spindle is operable to axially translate in response to rotation of said screw drive nut;

a locking system comprising a pin supported on the body and operable to engage one of a plurality of holes disposed on an outer circumference of said cap.

* * * * *